(12) United States Patent
Frasure et al.

(10) Patent No.: US 7,270,360 B2
(45) Date of Patent: Sep. 18, 2007

(54) STORAGE UNIT FOR A MOTOR VEHICLE

(75) Inventors: James R. Frasure, Henderson, NV (US); Matthew D. Sheldon, Henderson, NV (US)

(73) Assignee: Diezal, Ltd., Henderson, NV (US)

( * ) Notice: Subject to any disclaimer, the term of this patent is extended or adjusted under 35 U.S.C. 154(b) by 124 days.

(21) Appl. No.: 11/197,048

(22) Filed: Aug. 3, 2005

(65) Prior Publication Data

US 2007/0029831 A1 Feb. 8, 2007

(51) Int. Cl.
*B60R 9/06* (2006.01)

(52) U.S. Cl. .................. 296/37.6; 296/36.09; 224/403

(58) Field of Classification Search ............. 296/26.09, 296/37.6, 39.2; 224/401, 402, 403, 404, 224/542; 414/537
See application file for complete search history.

(56) References Cited

U.S. PATENT DOCUMENTS

| | | | | |
|---|---|---|---|---|
| 4,215,896 A * | 8/1980 | Drouin | ...................... | 296/37.6 |
| 4,305,695 A * | 12/1981 | Zachrich | ...................... | 414/522 |
| 4,573,731 A * | 3/1986 | Knaack et al. | ............. | 296/37.6 |
| 4,580,827 A * | 4/1986 | Feagan | ...................... | 296/37.6 |
| 4,685,695 A * | 8/1987 | LeVee | ...................... | 280/441.2 |
| 4,938,398 A * | 7/1990 | Hallsen | ...................... | 224/404 |
| 5,137,322 A * | 8/1992 | Muirhead | ................. | 296/39.2 |
| 5,232,259 A * | 8/1993 | Booker | ...................... | 296/37.6 |
| 5,713,500 A * | 2/1998 | Ingerson et al. | ............ | 224/404 |
| 5,779,047 A * | 7/1998 | Darrah | ...................... | 206/373 |
| 5,845,952 A * | 12/1998 | Albertini et al. | ........... | 296/37.6 |
| 5,964,492 A * | 10/1999 | Lyon | ...................... | 296/37.6 |
| 6,318,781 B1* | 11/2001 | Mc Kee | ................... | 296/26.09 |
| 6,328,364 B1* | 12/2001 | Darbishire | ............... | 296/26.09 |
| 6,375,054 B1* | 4/2002 | Lance et al. | ................. | 224/404 |
| 6,629,714 B2* | 10/2003 | Campbell | .................. | 296/37.6 |
| 6,644,712 B1* | 11/2003 | Rafi-Zadeh | ................. | 296/37.8 |
| 6,695,375 B1* | 2/2004 | May | ...................... | 296/37.6 |
| 6,729,514 B1* | 5/2004 | Delgado | ..................... | 224/404 |
| 6,871,921 B2* | 3/2005 | Ernst | ....................... | 312/348.3 |

\* cited by examiner

*Primary Examiner*—D. Glenn Dayoan
*Assistant Examiner*—Paul Chenevert
(74) *Attorney, Agent, or Firm*—Bryan Cave LLP; Allan Watts

(57) ABSTRACT

A storage unit installed in a compartment of a motor vehicle such as the bed of a pickup truck and a method of distributing such devices. Embodiments include a cover, a support structure, and a rawer and may have the same horizontal dimensions as the compartment or bed but sit below the wheel wells to allow bulky cargo to be carried. Embodiments include a slanted drawer face to facilitate rolling or sliding cargo onto the device, a seal to prevent dirt or sand from getting under the cover, cutouts in the cover for the wheel wells, or a combination thereof. In some embodiments, movable dividers are installed in the drawer to form separate storage areas. The method of distribution includes providing identical drawers, providing different size covers for different vehicles, providing support structures, and installing or selling the storage devices with identical drawers but different size covers, for instance.

21 Claims, 7 Drawing Sheets

STORAGE UNIT FOR A MOTOR VEHICLE

FIELD OF INVENTION

This invention relates generally to systems and devices for storing items in or on a motor vehicle, and methods of manufacturing, distributing, installing, and using, such systems and devices.

BACKGROUND OF THE INVENTION

Various storage devices have been used for storing items in or on motor vehicles, including containers such as boxes and drawers, a number of which have been fixed or attached to the vehicle. Such storage devices have been used to store a wide range of items including tools, parts, materials, and the like. A number of different storage devices have been used in particular compartments of the motor vehicle, such as the bed of a pickup truck.

Certain storage devices have at least partially fulfilled the need to store various items, but have taken up a significant portion of the horizontal area of the compartment of the vehicle. As an example, U.S. Pat. Nos. 4,215,896; 4,580,827; 4,685,695; 4,938,398; 5,137,322; 5,232,259; 5,713,500, 5,964,492; 6,375,054; and 6,729,514 illustrate a number of different storage apparatuses for mounting within the bed of a pickup truck that take up at least a significant portion of the bed of the pickup truck. Because such storage devices occupy a significant portion of the horizontal area of the compartment or bed, these devices interfere with the vehicle being able to transport certain items that otherwise would fit into the compartment or bed. As an example, some storage devices prevent the vehicle from being able to transport quads, a stack of drywall, a stack of plywood, particular sizes of lumber, or the like.

Storage devices for vehicles have been contemplated that are flat, and thus do not reduce the horizontal area of the compartment or bed. U.S. Pat. Nos. 4,305,695; 4,573,731; 5,845,952, and 6,328,364 illustrate flat drawers that may be installed in the bed of a pickup truck, for example. However, such prior art storage devices made it difficult to roll or slide cargo on top of them, from the tail gate, for instance. Further, dirt, or fine cargo such as sand placed on top of the prior art storage devices may penetrate into or around the storage devices. Further, many prior art storage devices either extended above the wheel wells of the vehicle, taking up too much of the vertical space of the bed, or occupied only the space between the wheel wells, creating an uneven surface or a low or hollow area in front of and behind the wheel well, where cargo or foreign material could get stuck, jam the storage device, or the like.

Further, many different vehicles, such as pickup trucks, are manufactured by different manufacturers. Although different vehicles may be similar in many respects and in approximate size, the storage compartments or beds of different vehicles often have different dimensions, even if only slightly different. Thus, storage systems, devices, and apparatuses for such vehicles may have been sized for a particular vehicle or set of vehicles, or various compromises may have been made so that one size storage device would be able to accommodate the different dimensions of different vehicles. This limited the design of such storage systems, devices, and apparatuses in many respects, increased cost, and the like.

Therefore, a need exists for systems, devices, apparatuses, and units for storing items within a vehicle that take away little or no horizontal space from the compartment of the vehicle in which they are located, that facilitate sliding or rolling cargo onto the devices, that at-least partially prevent dirt or fine cargo located on top of the devices from getting into or around the devices, that prevent cargo or foreign material from getting stuck around wheel wells, or a combination thereof. Further, a need exists for such devices to be able to support significant loads, be of reasonable cost, and provide for storage of a variety of items in an organized fashion. Still further, a need exists for methods of manufacturing, distributing, installing, and using, such systems and devices. Even further, a need exists for such devices that can fit into a number of different vehicles with different dimensions, and yet provide for at least some use of common parts and components. Potential for improvement exists in these and other areas that may be apparent to a person of skill in the art having studied this document.

SUMMARY OF PARTICULAR EMBODIMENTS OF THE INVENTION

Embodiments of this invention include storage apparatuses configured to be installed within a compartment of a motor vehicle, storage units configured to be installed within a bed of a pickup truck, and methods of distributing storage devices to be installed in the beds of pickup trucks.

Various embodiments of the invention provide as an object or benefit that they partially or fully address one or more of the needs described herein, for instance, in the background section above. As specific examples, the present invention provides various embodiments that take away little or no horizontal space from the compartment of the vehicle in which they are located, that facilitate sliding or rolling cargo onto the devices, that at-least partially prevent dirt or fine cargo located on top of the devices from getting into or around the devices, that prevent cargo or foreign material from getting stuck around wheel wells, or a combination thereof. Further features and advantages of various embodiments of the invention may be apparent to those skilled in the art.

A specific embodiment of this invention provides a storage apparatus configured to be installed within a compartment of a motor vehicle. In various embodiments, the storage apparatus may have substantially the same horizontal dimensions as the floor of the compartment, for example, such that the storage apparatus overlies substantially all of the floor. The storage apparatus may include a cover, and in some embodiments, the cover may have a plurality of wheel well cutouts to allow the cover to sit below the top of wheel wells located in the compartment. The cover may be made of diamond plate or hardened plastic in some embodiments, for example. Further, in some embodiments, there may be a seal substantially along the perimeter of the cover to at least partially prevent dirt or sand, for instance, from unintentionally getting between the cover and the floor. The seal may include or be made of an elastomeric material in some embodiments.

The storage apparatus may also include at least one drawer configured to be stored between the cover and the floor of the compartment. In some embodiments, a plurality of dividers may be provided that are configured to be installed within the drawer to form separate storage areas within the drawer. In certain embodiments, the drawer and dividers are configured so that the dividers may be installed in a plurality of locations to form different sizes of storage areas. In select embodiments, for example, the dividers may be installed in at least two orientations at right angles to each other. In some embodiments, the storage apparatus or the drawer may have a drawer face configured to cover the drawer at the rear end of the drawer (i.e., the end toward the rear of the vehicle). This drawer face may be set at an angle of at least 30 degrees from vertical leaning toward the front of the vehicle to facilitate rolling or sliding cargo onto the cover for storage within the compartment. In particular embodiments, the drawer face may be set at an angle of about 45 degrees from vertical, for instance.

Further, various embodiments of the storage apparatus include a support structure configured to attach to the compartment and to support the cover substantially horizontally above the floor. In a number of embodiments, the support structure may include a plurality of drawer slides configured to slidably support the drawer. The support structure may also include, in some embodiments, a plurality of support beams which may have a cross section with a greater dimension at the bottom than at the top. This cross section may gradually decrease in dimension from the bottom to the top, for example.

Another embodiment of this invention provides a storage unit configured to be installed specifically within the bed of a pickup truck. The storage unit may include a top surface substantially parallel to the floor of the bed and covering a majority of the floor of the bed, and this top surface may be closer to the floor than to the top of the walls of the bed. Some embodiments also have a seal between the top surface and the bed, at least one storage compartment located between the floor of the bed and the top surface of the storage unit, an angled ramp sloping upward toward the front of the pickup truck and extending substantially from the floor of the bed by the tail gate to the top surface of the storage unit, or a combination of such features. In certain embodiments, he storage unit may cover substantially all of the floor of the bed such that the storage unit overlies substantially all of the floor. In various embodiments, the storage compartment may be a drawer configured to pull out of the rear of the pickup truck when the tail gate is down, the ramp may be attached to the drawer, the storage unit may include a plurality of dividers configured to be installed within the drawer to form separate storage areas within the drawer (e.g., which may be similar to the dividers described above) or a combination thereof.

Yet another specific embodiment of this invention provides a method of distributing storage devices to be installed in the beds of a plurality of different pickup trucks. Such beds may have different dimensions. This method may include the step of providing a plurality of substantially identical size drawers, which may have, for example, a length that is no less than 50 percent of the length of at least one size bed. Such a method may also include the step of providing a plurality of different size covers configured to mount in beds that have different dimensions. Such covers may each have a length that is no less than the length of the drawers, for example. The method may further include the step of providing support structures configured to support the covers above the drawers. These support structures may be configured to support the covers no more than one half of the height of the walls above the floor of the bed in many embodiments. The method may further include the step of installing a plurality of the storage devices within the beds of the pickup trucks, or in the alternative (or in addition), selling such storage devices. Each storage device may include at least one of the substantially identical size drawers, one of the covers (e.g., from the group that has different dimensions), and at least one of the support structures.

In certain embodiments, the method may also include the step of providing a means for sealing between the covers and the beds, such as described herein, for example. In particular embodiments of the methods, the storage device may be configured to overlie substantially all of the floor of the bed in which the storage device is to be installed.

BRIEF DESCRIPTION OF THE DRAWINGS

The figures in this document illustrate various exemplary embodiments of the present invention, wherein like reference numerals represent like elements. Embodiments of the invention may include part or all of the features shown in one of these drawings, or may include features from two or more figures, for instance.

Accordingly.

DETAILED DESCRIPTION OF EXAMPLES OF EMBODIMENTS

Figure 1:
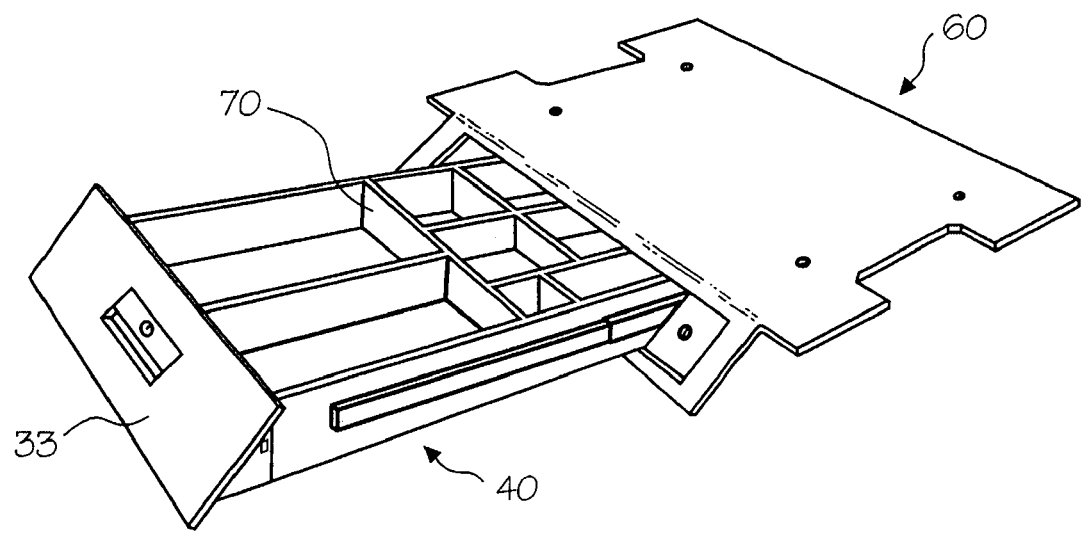
FIG. 1 is a perspective isometric view illustrating an example of an embodiment of a storage apparatus or unit in accordance with the invention having a drawer and a cover.

Various embodiments of this invention include storage apparatuses configured to be installed within a compartment of a motor vehicle, storage units configured to be installed within a bed of a pickup truck, and methods of manufacturing and distributing storage devices and drawers to be installed in the beds of pickup trucks. FIGS. 1-11 illustrate one or more examples of a storage device or apparatus to be installed, for example, in the bed of a pickup truck. As shown in FIG. 1, this embodiment may include drawer 40 and cover 60. Drawer 40 may include drawer face 33, and may include one or more drawer dividers 70. As used herein, directions are relative to the vehicle unless clearly otherwise. For example, the word rear, refers to the direction of the rear of the vehicle when the storage apparatus or unit is installed in the vehicle. In the embodiment illustrated, drawer face 33 may face the rear of the vehicle.

In some embodiments, when drawer 40 is closed, drawer 40 may be stored under cover 60 or between cover 60 and the floor of the motor vehicle compartment or the bed of the pickup truck, for example. In some embodiments, when drawer 40 is closed, drawer face 33 may be just forward of the tailgate of the pickup truck so that it is possible to close or raise the tailgate. In some embodiments, it may be necessary to open or lower the tailgate in order to open drawer 40, for example, by pulling drawer 40 toward the rear of the vehicle and out from under cover 60. In other embodiments, it may be possible to open drawer 40, at least part way, when the tailgate is closed or up. In some embodiments, when drawer 40 is open, drawer 40 may be at least partially supported by the tailgate.

In various embodiments, cover 60, or the storage device, apparatus, or unit, may have substantially the same horizontal dimensions as the floor of the compartment or bed such that the device, apparatus, or unit overlies substantially all of the floor. This may provide considerable storage volume, for example, within drawer 40, without having a large vertical dimension. This may allow the user to maintain full use of the compartment or bed, for example, for hauling bulky cargo such as lumber, drywall, carpeting, pipe, recreational vehicles such as quads, motorcycles, snow mobiles, jet skis, kayaks, canoes, and the like. In addition, in many embodiments, the storage surface for such cargo may remain relatively horizontal, flat, or both, which may facilitate loading, unloading, moving cargo on the storage surface, sweeping the storage surface, supporting cargo, standing, walking, sitting, or sleeping on the storage surface, etc. Many embodiments avoid recessed areas in the top surface of the storage device or unit, upward steps toward the rear of the vehicle, or partial or complete blocking of the tailgate that would hinder removing cargo from the cargo area or sweeping or spraying out the cargo area, for instance.

Further, at least when heavy cargo is not being carried on top of the storage device, apparatus, or unit, and especially when heavy cargo such as tools or metal parts are carried within drawer 40 rather than in a higher profile storage device, the center of gravity of the vehicle is lowered reducing the risk of rollover and improving handling and safety. In comparison with storing such heavy cargo directly within a bed or compartment of a vehicle, when the heavy cargo is carried within drawer 40, the embodiment illustrated may improve vehicle handling and prevent damage to the vehicle or cargo by reducing shifting of the cargo, and may also improve security by making theft of the cargo more difficult, by hiding the cargo from view, or both. Further, in comparison with a storage device that is mounted just behind the cab of a pickup truck, the storage device of many embodiments of the invention results in more weight being over the rear wheels, improving traction, particularly for two-wheel drive vehicles. In some embodiments, the storage device, apparatus, or unit of the invention may change the shape of the bed of a pickup truck in a manner that reduces aerodynamic drag, facilitates loading at a loading dock, reduces the distance that cargo must be lifted to remove it from the compartment or bed, or a combination thereof.

Figure 2:
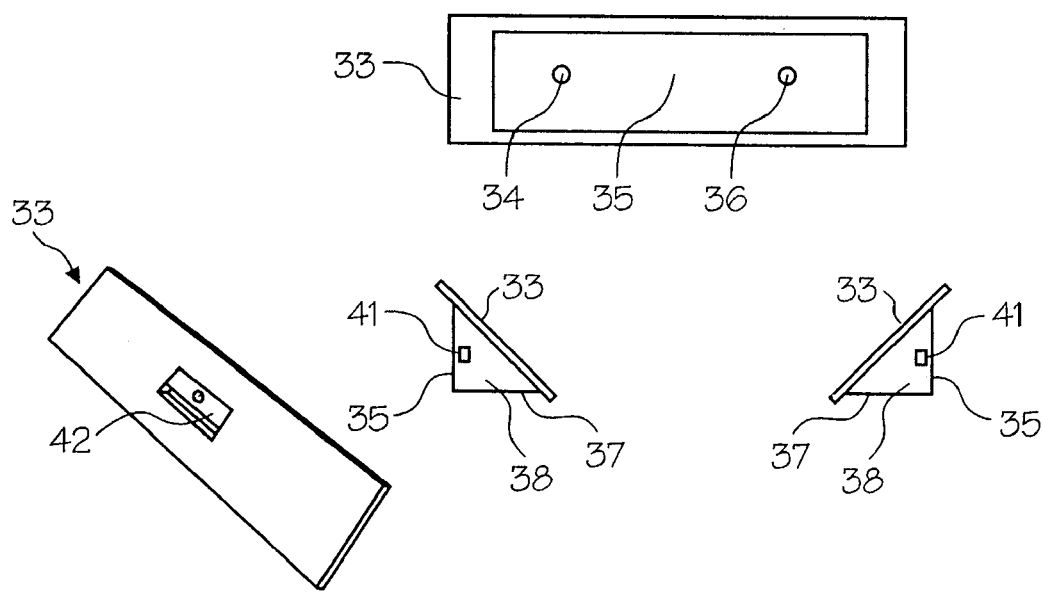
FIG. 2 is a detail view illustrating an example of the front of the drawer of the embodiment shown in FIG. 1.

FIG. 2 illustrates an example of face 33 of drawer 40. Face 33 may include at least one bracket 38, for example, between face 33 and drawer 40. Bracket 38 may have a side 35 which may contact drawer 40, and a bottom 37. In some embodiments, drawer face 33, bracket 38, side 35, or a combination thereof, may attach to drawer 40, for example, with fasteners, such as screws or bolts, which may pass through holes 34 and 36, for example. In some embodiments, face 33 may be or form part of drawer 40. In some embodiments, drawer 40, face 33, bracket 38, or a combination thereof, may include a latching or locking system 42, which may have a mechanism that passes, for example, through holes 41. Locking system 42 may include a key or combination lock, for example. In many embodiments, additional security is obtained from the storage device, apparatus, or unit being substantially out of view in the compartment or bed, at least from a distance, at least when the tailgate is closed.

In some embodiments, drawer face 33 may cover the rear of drawer 40 and face 33 may be slanted or set at an angle, for example, of at least 30 degrees from vertical leaning toward the front of the vehicle. In various embodiments, face 33 is slanted or set at an angle of about 30, 35, 40, 45, 50, 55, 60, 65, 68, or 70 degrees from vertical, as examples. When drawer 40 is closed, face 33 may facilitate rolling or sliding cargo onto cover 60 for storage within the compartment or bed of the vehicle, for example, on top of cover 60. In some embodiments, face 33 may form an angled ramp extending substantially from the floor of the compartment or bed of the vehicle by the tailgate to the top surface of the storage apparatus or unit, for example, to the top surface of cover 60. Such a ramp may slope upward toward the front of the vehicle or pickup truck, for example. In the embodiment illustrated, bracket 38 may form the angle or slant of drawer face 33.

In the particular embodiment illustrated, drawer face 33 is attached to drawer 40. In other embodiments, drawer face 33 may not be attached to drawer 40. In some embodiments, face 33 may be attached to cover 60, may fold over drawer 40 when drawer 40 is closed, or the like, but may still be slanted at an angle, and may form a ramp. In still other embodiments of the invention, drawer face 33 may not be slanted or at an angle.

Figure 3:
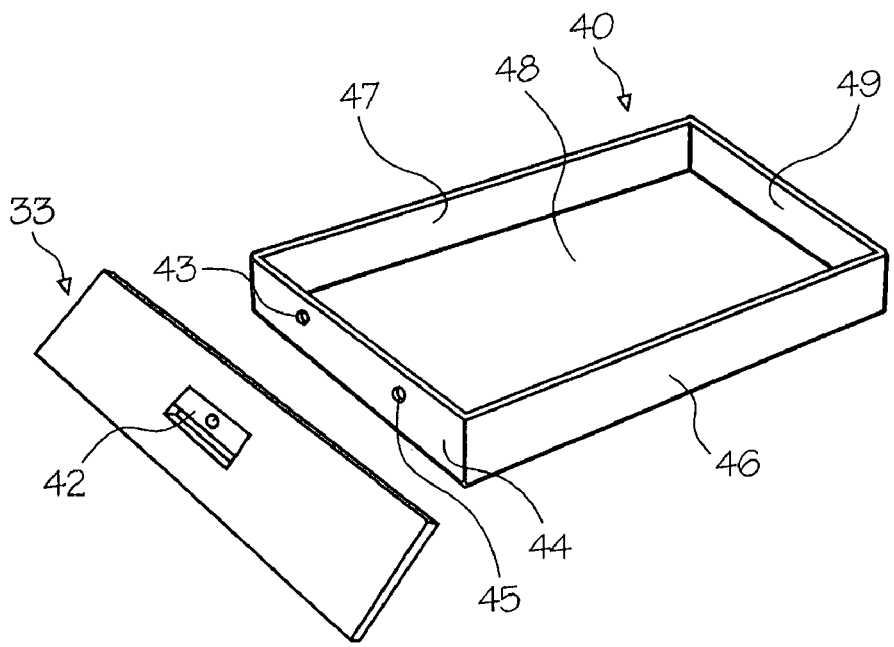
FIG. 3 is a close-up isometric view, shown in perspective, illustrating an example of the drawer of the embodiment shown in FIG. 1, shown without dividers in the drawer.

FIG. 3 illustrates an example of drawer 40, shown without dividers 70. Drawer face 33 is also shown. In the embodiment illustrated, drawer 40 includes bottom 48, rear end 44, passenger side 46, driver side 47, front end 49, and holes 43 and 45. In this embodiment, holes 43 and 45 may line up with holes 34 and 36 shown in FIG. 2 for attachment of face 33 to drawer 40. In various embodiments, drawer 40 may be configured to be installed with front end 49 toward the front of the vehicle and rear end 44 toward the rear of the vehicle. In some embodiments, rear end 44 may be covered by drawer face 33. Some embodiments of the invention may lack dividers 70, such as illustrated in this view.

Figure 4:
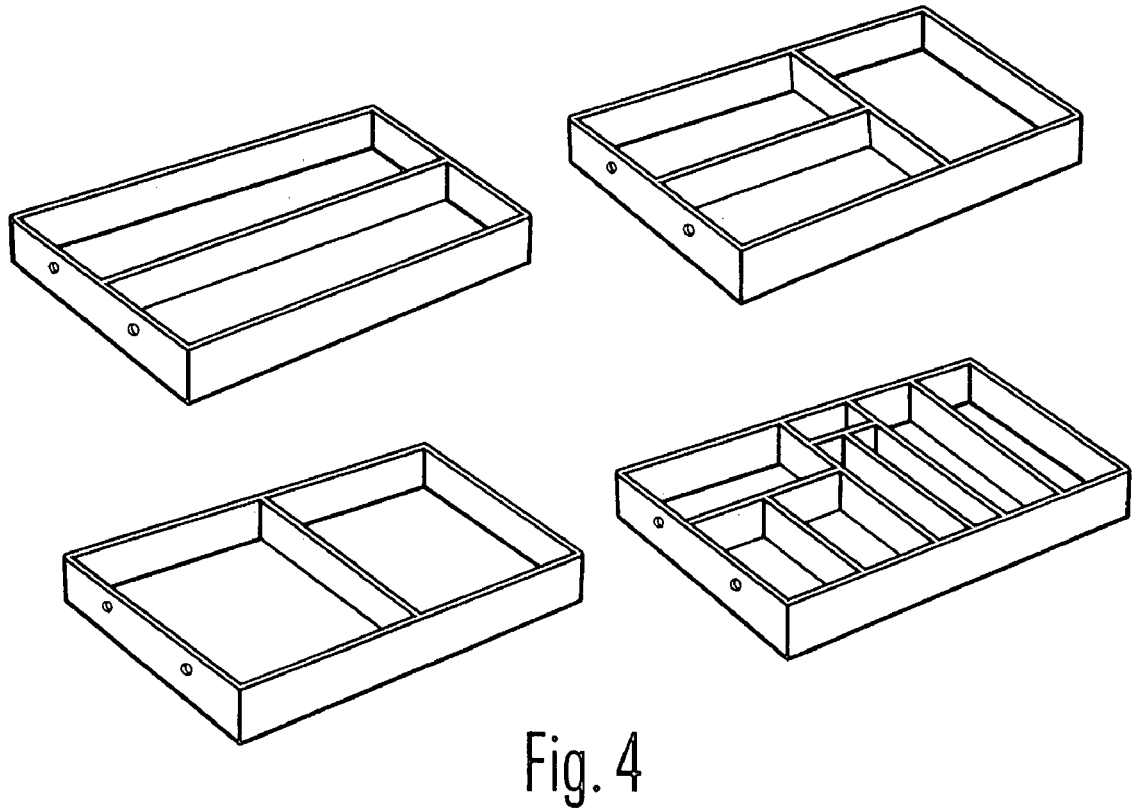
FIG. 4 illustrates four alternate arrangements of dividers within the drawer of the embodiment shown in FIG. 1, shown in isometric and in perspective.
Figure 11:
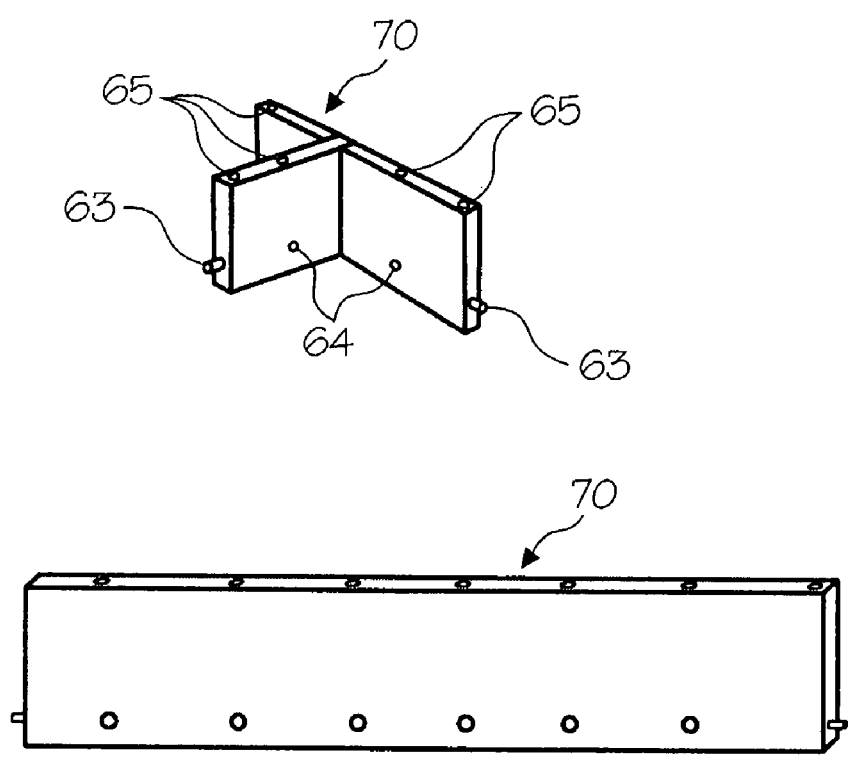
FIG. 11 is a detail isometric perspective view illustrating an example of an embodiment showing how the dividers for drawers, illustrated for example, in FIG. 4, may connect.

Some embodiments of the invention include dividers within a storage compartment such as drawer 40. Four alternate arrangements of dividers 70 within drawer 40 are illustrated in FIG. 4. Dividers 70 may be configured to be installed within a storage compartment such as drawer 40 to form separate storage areas within the compartment or drawer. In some embodiments, a compartment such as drawer 40, and dividers 70 may be configured so that dividers 70 may be installed in a plurality of locations within drawer 40, for example, to form different sizes of storage areas. In certain embodiments, dividers 70 may be installed in at least two orientations at right angles to each other, as illustrated by the right two arrangements of dividers 70 shown in FIG. 4. Details of a particular embodiment of dividers 70 are shown in FIG. 11 and are described below with reference thereto.

Figure 5:
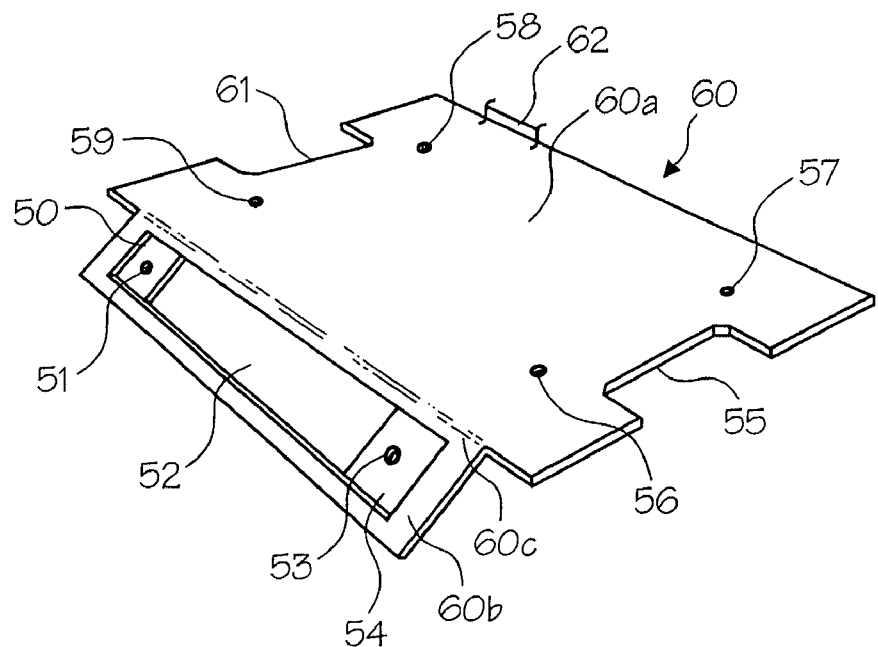
FIG. 5 is an isometric close-up view illustrating an example of the cover of the embodiment shown in FIG. 1.
Figure 6:
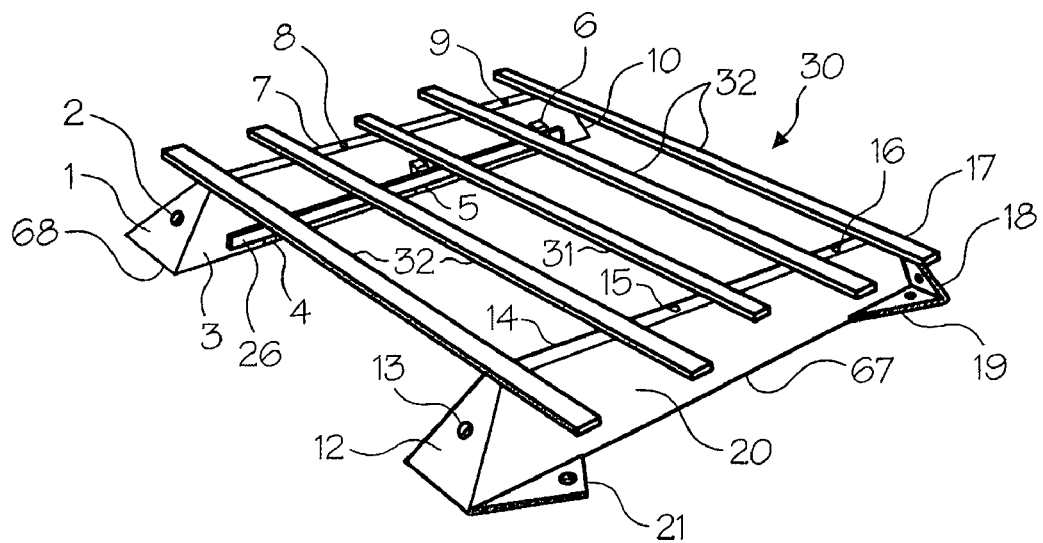
FIG. 6 is a close-up isometric perspective view illustrating an example of a support structure for the embodiment shown in FIG. 1.
Figure 7:
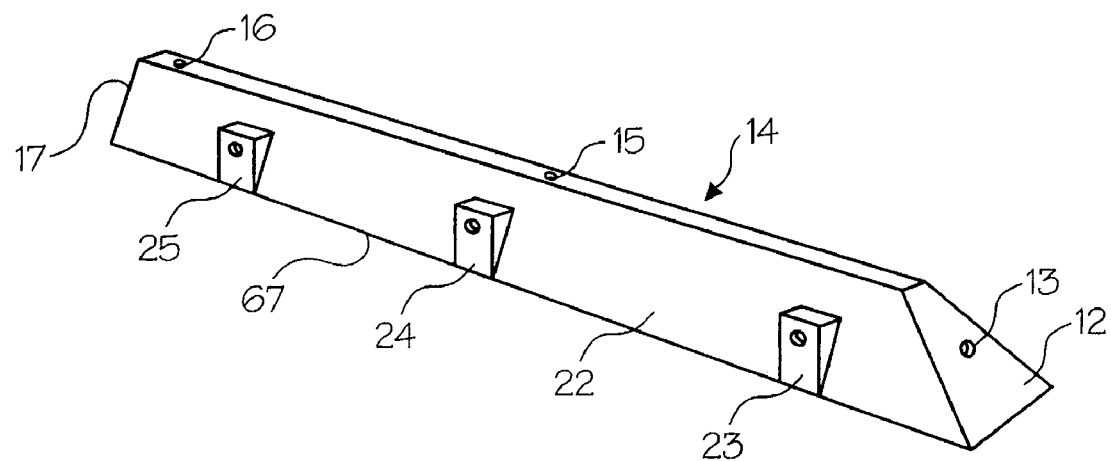
FIG. 7 is a close-up isometric perspective view illustrating an example of a passenger-side beam of the support structure embodiment shown in FIG. 6, looking from the interior of the support structure.
Figure 8:
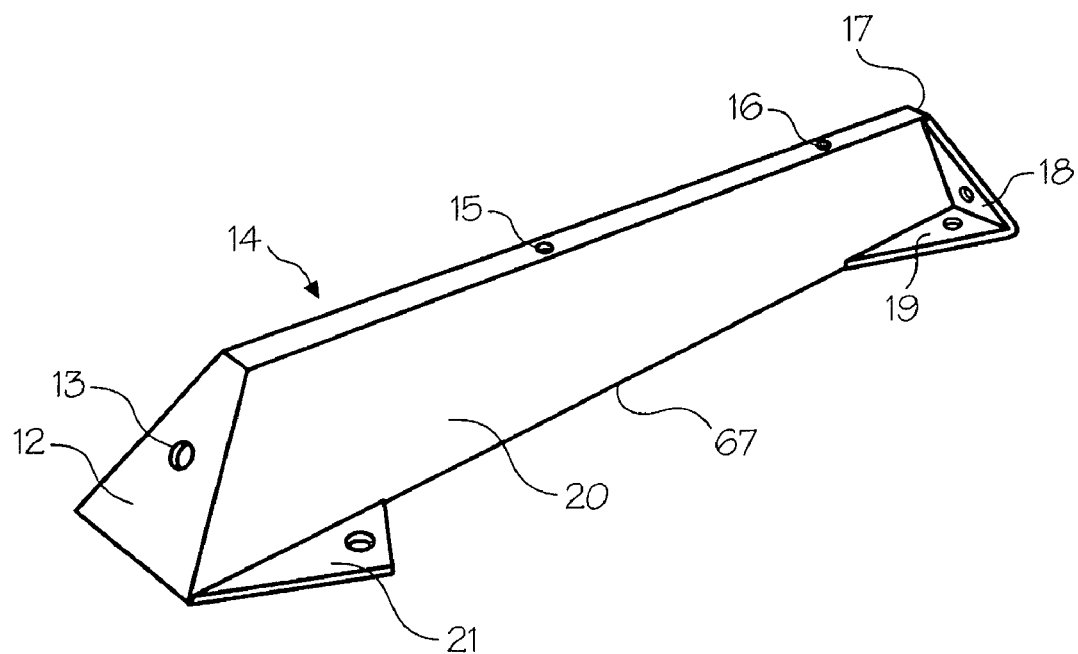
FIG. 8 is a close-up isometric perspective view illustrating an example of a passenger-side beam of the support structure embodiment shown in FIG. 6, looking from the exterior of the support structure.
Figure 9:
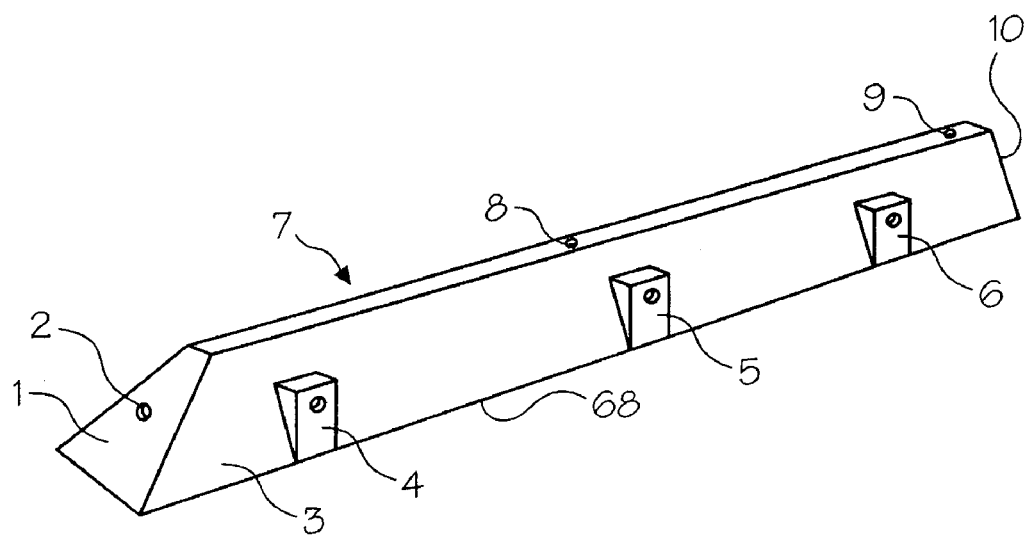
FIG. 9 is a close-up isometric perspective view illustrating an example of a driver-side beam of the support structure embodiment shown in FIG. 6, looking from the interior of the support structure.
Figure 10:
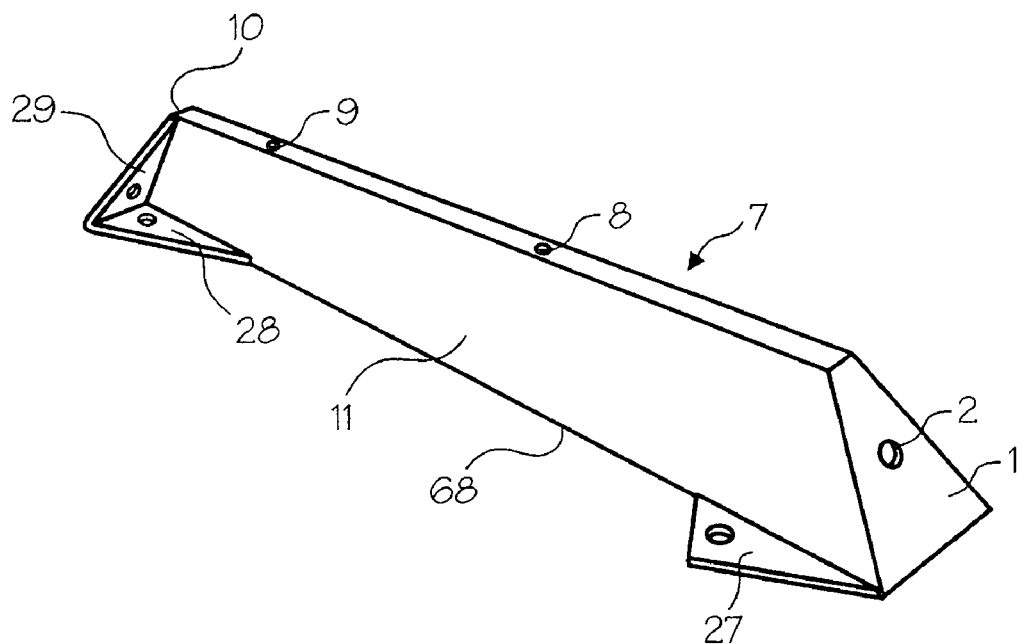
FIG. 10 is a close-up isometric perspective view illustrating an example of a driver-side beam of the support structure embodiment shown in FIG. 6, looking from the exterior of the support structure.

FIG. 5 is a close-up view illustrating a particular embodiment of lid or cover 60. Cover 60 may be configured to mount in a compartment of a motor vehicle, such as the bed of a pickup truck. Cover 60 may include top surface 60a and rear surface 60b, which may be separated by bend 60c. Surfaces 60a, 60b, or both, may be flat or substantially flat. In some embodiments, when installed, top surface 60a may be horizontal, substantially horizontal, or parallel or substantially parallel with the floor of the compartment of the vehicle or bed of the pickup truck in which the storage apparatus, device, or unit is installed. In some embodiments, rear surface 60b may be at a slant or angle, which may correspond to the angle of face 33. In some embodiments, a joint may be used instead of bend 60c. Cover 60 may be made of steel, galvanized steel, stainless steel, or aluminum sheet metal or plate, or Hardened plastic for example between 16 gauge and ¼-inch thick. Cover 60 may include a surface material or texture configured to prevent slipping, enhance appearance, prevent or reduce corrosion, or a combination thereof. In particular embodiments, cover 60 may be diamond plate.

Cover 60 may have a recessed area 50, for example, in rear surface 60b, to receive drawer face 33. In the embodiment illustrated, cover 60 further includes holes 51, 53, 56, 57, 58, and 59, for example, to attach cover 60 to an underlying support structure, examples of which will be described below. In this embodiment, rear surface 60b of cover 60 also includes opening 52 for drawer 40.

In some embodiments, cover 60 may be configured to mount in compartments of vehicles or beds of pickup trucks, for instance. In some applications, the compartments or beds may have walls, and cover 60 may be configured to mount no more than one half of the height of the walls above the floor of the compartment or bed. In other words, top surface 60a of cover 60 may be, in certain embodiments, no more than one half of the height of the walls above the floor of the compartment or bed. In particular applications, the compartments or beds may have wheel wells and cover 60 may be configured to sit below the top of the wheel wells. In specific embodiments, cover 60 may have wheel well cutouts 55 (passenger side) and 61 (driver side) to allow cover 60 to sit below the top of the wheel wells in the compartment or bed.

In various embodiments, a seal 62 may be provided, for example, substantially along at least part of the perimeter of cover 60 to at least partially prevent various materials such as dirt, sand, or gravel from unintentionally getting between cover 60 and the floor of the compartment or bed, at least when drawer 40 is in a closed position. Seal 62 may include rubber, an elastomeric material or elastomer, closed cell foam, open cell foam, an adhesive, caulk, tape, or the like. In particular embodiments, seal 62 comprises an elastomer attached to the perimeter of cover 60 with an adhesive. In other embodiments, a seal may be formed with a bed liner or a coating. In some embodiments, seal 62 may be located under cover 60, for example, between cover 60 and the floor of the compartment or bed. In some embodiments, a seal may be formed by placing or injecting a foam material between cover 60 and the floor, for instance. Such a foam material may extend from the cover 60 to the floor in some embodiments, and may occupy much or all of the space outside of the support structure or beams described below. Seal 62 may seal against the vehicle compartment or bed, for example, against the walls of the compartment or bed. Seal 62 may at least partially prevent foreign materials such as dirt or snow, or fine cargo such as sand, from getting under cover 60 and into or around drawer 40, which could potentially jam drawer 40. In certain embodiments, seal 62 may be partially or completely water tight and may at least partially prevent water, such as rain water, from getting below cover 60.

Cover 60 may be supported above the floor of the compartment or bed of the vehicle with a support structure. An example of such a support structure, support structure 30, is illustrated in FIG. 6, and FIGS. 7-10 illustrate particular parts of support structure 30, namely, support beams 7 and 14. In the embodiment illustrated, passenger side beam 14 and driver side beam 7 may attach to the floor of the compartment or bed of the vehicle, for example, via fasteners such as screws, bolts, or rivets, for instance, through mounting tabs or plates 19, 21, 27 and 28, which may have one or more holes through them as shown. In some embodiments, self-tapping screws may be used for this purpose. Beams 7 and 14 may be installed parallel to the long axis of the vehicle with sides 11 and 20 facing the outside of the vehicle and sides 3 and 22 facing inward. In some embodiments, beams 7 and 14 may also attach to one or more walls of the compartment or bed, for example, to the front wall of a bed of a pickup truck (i.e., adjacent to the cab), for instance, via mounting plates 18 and 29. In such embodiments, faces 10 and 17 may be flush with the wall of the bed. On the other hand, in some embodiments, faces 10 and 17 may be offset from the wall of the bed. In various embodiments, beams 7 and 14 may be about as long or longer than drawer 40.

Beams 7 and 14 may have slanted faces 1 and 12, for example, at the rear of the vehicle, to which rear surface 60b of cover 60 may attach, for instance, via fasteners through holes 2 and 13 in faces 1 and 12. Faces 1 and 12 may be angled at the angle of rear surface 60b, drawer face 33, or both, for example, at least 30 degrees from vertical leaning toward the front of the vehicle. In particular embodiments, beams 7 and 14 may also attach to top surface 60a of cover 60, for instance, via fasteners through holes 8, 9, 15, and 16. In some embodiments, some or all of holes 2, 8, 9, 13, 15, and 16 may be threaded for screws.

In certain embodiments, support structure 30 may include transverse support beams 31 and 32 as shown, which may be mounted parallel to an axle of the vehicle. Support beams 31 may be shorter than support beams 32, for example, to accommodate wheel wells in the compartment of bed in which the storage apparatus, device, or unit is to be installed. Support structure 30 in general, and beams 31 and 32 specifically, may be configured to provide additional strength and stiffness to cover 60, for example, so that heavy cargo can be carried on top of cover 60. In some embodiments, support beams 31 and 32 may be solid rectangular bars, for example, ½-inch thick steel or aluminum or Hardened plastic. In other embodiments, support beams 31 and 32 may be square bars, angles, channels, rectangular or square tubing, or the like. Support beams 31 and 32 may be attached to cover 60, to support beams 7 and 14, or to both, for example, via fasteners or welding. In particular embodiments, support beams 31 and 32 are welded to cover 60 with fillet welds, and the assembly of cover 60 and support beams 31 and 32 is screwed or bolted to support beams 7 and 14.

In many embodiments, support beams 7 and 14 may guide or position drawer 40. In some embodiments, drawer slides 26 may slidably support drawer 40. In certain embodiments, drawer slides 26 may be attached to each beam 7 and 14 and may support drawer 40. Further, drawer slides 26 may be attached to drawer 40. In various embodiments, wheels may be provided to engage drawer slides 26. Ball bearings may be used in some embodiments of drawer slides 26 to reduce friction.

In embodiments such as the one illustrated, raised areas, bosses, or brackets 4, 5, 6, 23, 24, 25, or a combination thereof may be provided, for example, on beams 7 and 14, to support drawer slides 26. In some embodiments, for example, where the interior sides 3 and 22 are vertical, raised areas, bosses, or brackets 4, 5, 6, 23, 24, 25, or a combination thereof may not be necessary and may be omitted. On the other hand, in some embodiments of the invention, drawer slides 26 may be omitted. In such embodiments, raised areas, bosses, or brackets 4, 5, 6, 23, 24, 25, or a combination thereof may also be omitted. In particular embodiments, drawer 40 may slide on the floor of the compartment or bed of the vehicle, on the tailgate, or both. In some such embodiments, wheels, rollers, or low-friction sliding surfaces may be used. Low-friction surfaces may be polytetrafluoroethylene (PTFE) or TEFLON, for example. In some embodiments, drawer slides may be provided under drawer 40 or may be attached to cover 60. In some embodiments, drawer 60 may help to support cover 60, at least when heavy cargo is placed on cover 60.

In certain embodiments, support beams 7 and 14 may have a cross section with a greater dimension at the bottom than at the top. In such embodiments, the cross section may gradually decrease in dimension from the bottom to the top. For instance, beams 7 and 14 may have a trapezoidal cross section, as shown, and may have a wider bottom surface 67 and 68 than a top surface. In some embodiments, the cross section of beams 7 and 14 may be triangular. Beams 7, 14, 31, 32, or a combination thereof, may be metal, such as steel or aluminum or Hardened plastic, may be galvanized or painted, and may be formed by bending, stamping, or rolling sheet metal, for example. Such sheet metal may be 16 gauge, for example. In other embodiments, beams 7, 14, 31, 32, or a combination thereof, may be plastic, may be a thermal plastic or a thermal set plastic, and may be fiber reinforced.

In a number of embodiments, support structure 30 may support cover 60, or specifically, top surface 60a of cover 60, horizontally, substantially horizontally, or parallel or substantially parallel to the floor of the compartment or bed. As used herein, the phrase "substantially horizontal" means about as horizontal, when properly installed, as the floor of the compartment or bed. In some embodiments, beams 7 and 14 may be placed sufficiently inward to clear wheel wells in the compartment or bed. In some embodiments, other storage compartments or drawers may be provided outboard of beams 7 and 14, for example, in front of or behind the wheel wells. In some embodiments, another storage compartment may be provided in front of (toward the front of the vehicle) drawer 40.

In various embodiments, support structure 30 may be configured to support cover 60, or specifically, top surface 60a of cover 60, above drawer 40 (at least when drawer 40 is in the closed position), but low enough in the compartment or bed of the vehicle to facilitate carrying cargo on top of cover 60 or top surface 60a.

In some embodiments, support structure 30 may be configured to allow cover 60, top surface 60a, or both to sit below the top of the wheel wells in the compartment or bed. In other embodiments, top surface 60a may be flush with or just above the tops of the wheel wells. In certain embodiments, a support structure may be provided that does not include beams 7 and 14. Such a support structure may support cover 60 from the walls of the compartment or bed, for example.

As mentioned previously, FIG. 11 illustrates how the dividers 70 for drawer 40 (shown for example, in FIG. 4) may connect. Dividers 70 may have male connectors 63, and corresponding female connectors or holes 64, for example. Male connectors 63 and female connectors 64 may be located in the lower portion of dividers 70 as shown, for example. Upper bracket mounting points 65 may also be provided in certain embodiments. In various embodiments, dividers 70 may be configured to be installed within drawer 40 to form separate storage areas within drawer 40. In some embodiments, drawer 40 and dividers 70 are configured so that dividers 70 may be installed in a plurality of locations to form different sizes of storage areas. In particular embodiments, dividers 70 may be installed in at least two orientations at right angles to each other.

Figure 12:
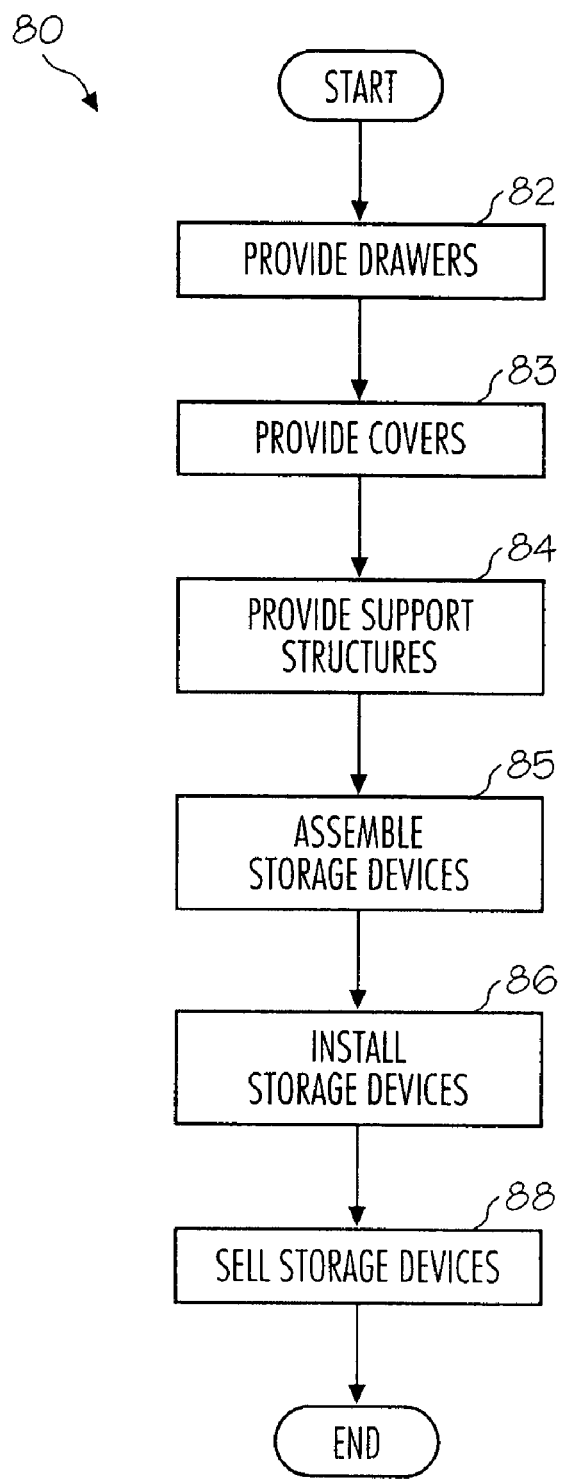
FIG. 12 is a flow chart illustrating an example of a method of distributing storage devices to be installed in the beds of different pickup trucks in accordance with the invention.

Turning now to methods in accordance with the invention, FIG. 12 illustrates an example of a method of distributing storage devices to be installed in compartments of different vehicles. Method 80 will be illustrated in the context of storage devices to be installed in the beds of different pickup trucks. But method 80, and other embodiments, may also apply to other storage devices to be installed in other vehicles. In the example that will be described, the different pickup trucks may be made by different manufacturers, may be made in different model years, or the like, and may have beds having different dimensions. In some cases, such differences in dimensions may be slight, but may prevent interchangeability of at least some components, for example, cover 60, for instance, particularly in embodiments where seal 62 is provided between cover 60 and the walls of the bed.

In the embodiment illustrated, method 80 includes providing a plurality of drawers (step 82), which may be provided through manufacturing, procurement, or the like. Although drawers are described in this example, in other embodiments, other types of storage compartments may be provided instead or in addition. In a particular embodiment, drawer 40 may be provided (e.g., in step 82) which may include manufacturing by cutting and bending sheet metal, joining the sheet metal, attaching hardware, installing dividers 70, or a combination thereof. In various embodiments, drawers may be provided (step 82) in one or more common sizes for different pickup trucks, for example. Such common sizes (or size) may be substantially identical in size. As used herein, components are substantially identical in size if they are within manufacturing tolerances for each other, or if they are interchangeable and intended to be the same within practical limits. In some embodiments, there may only be one common size drawer. In other embodiments, there may be one size drawer for full size pickup trucks and one size drawer for compact pickup trucks. In some embodiments, there may be different size drawers for standard beds and long beds, for another example.

In many embodiments, the drawers provided (in step 82) may have a length that is no less than 50 percent of the length of at least one size bed that the drawer is intended to be installed in. In some embodiments, the drawers (provided in step 82) may be considerably longer than 50 percent of the length of at least one size bed. In some embodiments, the drawers (provided in step 82) may be as long as, or slightly shorter than the length of the shortest size bed that the drawers are intended to be installed in, for instance.

In the embodiment illustrated, method 80 also includes providing a plurality of covers (step 83), which may also be provided through manufacturing, procurement, or the like. These covers (provided in step 83) may be like cover 60 described above, for example. Providing the covers (step 83)

may include cutting, bending, grinding, drilling, coating, texturing, providing or attaching a seal (e.g., seal 62) or a combination thereof. The cutting may be performed with a torch, for example, via oxy-acetylene flame cutting, which may be automated, and in some embodiments, may be numerically controlled. In some embodiments, the step of providing the covers (step 83) may include providing a non-slip coating, surface, or texture, such as diamond plate, for example.

Unlike the drawers, the covers (provided in step 83) may need to be custom made or made specially for the different pickup trucks having beds with different dimensions. In other words, there may be more different sizes of covers than there are different sizes of drawers. The covers (provided in step 83) may be configured to mount in the beds having different dimensions, and thus, may need to have different dimensions to correspond to the beds in which they are to be installed, at least in embodiments where a means for sealing, such as seal 62 described above, is to be provided between cover 60 and the walls of the bed. In a number of embodiments, the covers (provided in step 83) may have a length that is no less than the length of the drawers (provided in step 82). In some embodiments, the covers (provided in step 83) may even be substantially longer than the drawers (provided in step 82). In some embodiments, the covers (provided in step 83) may be as long as the bed or substantially as long as the bed, in some embodiments, minus the horizontal dimension in that direction of drawer face 33.

In some embodiments, the step of providing the covers (step 83) may include providing a means for sealing between the covers and the beds. For example, seal 62 described above may be provided. In some embodiments, seal 62 may be attached to cover 60, for example, with an adhesive. In other embodiments, a means for sealing between the covers and the beds may be provided as a separate step or in conjunction with a different step.

In the embodiment illustrated, method 80 further includes providing a plurality of support structures (step 84), which may also be provided through manufacturing, procurement, or the like. The support structures (provided in step 84) may be like support structure 30 or other support structures described above, for example. In a particular embodiment, support structure 30 may be provided (step 84) which may include manufacturing by cutting, bending sheet metal, joining the sheet metal, attaching hardware, drilling, welding, or a combination thereof. In some embodiments, providing (step 84) of support structure 30 may include molding or extruding plastic, for example, cutting plastic, drilling plastic, welding or gluing plastic, or a combination thereof.

In various embodiments, support structures may be provided (step 84) in one or more common sizes for different pickup trucks, for example. Such common sizes (or size) may be substantially identical in size. In some embodiments, there may only be one common size support structure (provided in step 84) for each common size drawer (provided in step 82), for instance. In other embodiments, there may be one size support structure for full size pickup trucks and one size support structure for compact pickup trucks. In some embodiments, there may be different size support structures for standard beds and long beds, for another example. In some embodiments, some components of the support structures may be common, while other components vary with different pickup trucks. For instance, in some embodiments, support beams 7 and 14 may be common for different pickup trucks, but support beams 32, 31, or both may vary, for example, for different widths of beds, different widths between wheel wells, and the like.

As mentioned, the support structures (provided in step 84) may be configured to be installed in the beds of pickup trucks. These beds may each have a floor and walls that extend up from the floor, and in some embodiments, it may be desirable that the storage device provide space for carrying cargo on top of the cover (e.g., provided in step 83). In various embodiments, the support structures (provided in step 84) may be configured to support the covers (e.g., provided in step 83) no more than one half of the height of the walls above the floor, below the tops of the wheel wells, or both.

Method 80 may also include the step of assembling the storage devices (step 85). Assembling (step 85) may include selecting a drawer, a cover, and a support structure (e.g., as provided in steps 82, 83, and 84) to be installed in a particular pickup-truck, for example. A plurality of storage devices may be assembled, for example, for different pickup trucks having beds having different dimensions. As mentioned, these storage devices may include drawers having substantially identical dimensions or sizes, and covers having different sizes for the different dimensioned beds. In different embodiments, the support structures may have substantially identical dimensions, may have different dimensions for different size beds, or may have some common parts and some different size parts.

In certain embodiments, method 80 may include performing the service of installing storage devices (step 86) in vehicles such as pick up trucks, for example, for the owners of the trucks. In such embodiments, the step of assembling the storage devices (step 85) may be performed in conjunction with the step of installing the storage devices (step 86), although in other embodiments these two steps may be performed separately.

The step of installing the storage devices (step 86) may include, for example, placing the support structure into the bed, drilling holes into the bed (which, in some embodiments, may be accomplished after marking and removing support structure 30), attaching the support structure to the bed with fasteners such as screws, for example, placing the cover onto the support structure, attaching the cover to the support structure, for example, with fasteners, such as screws, and installing the drawer. In some embodiments, support structure 30 may be installed assembled as shown, for example, in FIG. 6, while in other embodiments, support structure 30 may be installed in the bed of the pickup truck in pieces. In some embodiments, drawer 40 may be installed in or attached to at least some parts of support structure 30 when support structure 30 is placed into or attached to the bed. For instance, drawer 40 may be attached to support beams 7 and 14 and this assembly may be placed into the bed to mark or drill the holes in the bed. In some embodiments, support structure 30, drawer 40, and cover 60 may all be placed into the bed before the holes in the bed are marked or drilled.

In some embodiments, the step of installing the storage devices (step 86), or one of the other steps of method 80, may include providing a means for sealing between the covers and the beds. For example, seal 62 described above may be provided or installed. In other embodiments, the cover may be sealed with caulk, for example, or other materials or components described herein, for instance.

In certain embodiments, at least some of the storage devices (for example, assembled in step 85) may be sold (step 88) to others for installation in vehicles. For example, storage devices may be sold (step 88) to end users to install (step 86) in their own vehicles, or storage devices may be sold (step 88) to dealers or vehicle customizing establishments for installation (step 86) in their customer's vehicles. The step of selling storage devices (step 88) may include, for example, advertising, taking orders, collecting payment, shipping, providing installation instructions, providing warranties, handling warranty claims, or a combination thereof. In some embodiments, the step of selling the storage devices (step 88) may include advertising and taking orders via the Internet, receiving payment or a promise to pay via the Internet, and shipping the storage devices (e.g., assembled in step 85) to customers. In some embodiments, some or all dividers 70 may be sold separately so that users can choose whether to purchase some or all of the dividers 70 that may be installed within drawer 60, for example.

In some embodiments, the step of selling the storage devices (step 88) may include providing a means for sealing between the covers and the beds. For example, seal 62 described above may be provided, which may be attached to cover 60, for example. In other embodiments, the cover may be sealed with caulk, for example, or other materials or components described herein, for instance. Such items may be provided with the storage devices, or instructions may be provided regarding sealing between the covers and the beds. As used herein, providing a means for sealing between the covers and the beds includes providing instructions regarding sealing between the covers and the beds, even if the materials that are to be used for this purpose are not provided.

The detailed description of examples of embodiments herein makes reference to the accompanying drawings, which show examples of embodiments by way of illustration and its best mode. While these examples of embodiments are described in sufficient detail to enable those skilled in the art to practice the invention, it should be understood that other embodiments may be realized and that logical changes may be made without departing from the spirit and scope of the invention. Thus, the detailed description herein is presented for purposes of illustration only and not of limitation. For example, unless stated otherwise, the steps recited in the method or process descriptions may be executed in any order and are not limited to the order presented.

Further, benefits, other advantages, and solutions to problems have been described herein with regard to specific embodiments. However, the benefits, advantages, solutions to problems, and element(s) that may cause benefit, advantage, or solution to occur or become more pronounced are not to be construed as critical, required, or essential features or elements of the claims or the invention. Reference to an element in the singular is not intended to mean "one and only one" unless explicitly so stated, but rather "one or more." As used herein, the terms "comprises", "comprising", or a variation thereof, are intended to cover a non-exclusive inclusion, such that a process, method, article, or apparatus that comprises a list of elements does not necessarily include only those elements but may include other elements not expressly listed or inherent to such process, method, article, or apparatus. Further, no element described herein is required for the practice of the invention unless expressly described as "essential" or "critical".

What is claimed is:

1. A storage apparatus configured to be installed within a compartment of a motor vehicle having a front and a rear, the compartment having a floor having horizontal dimensions, the apparatus comprising:
    a cover having a perimeter;
    at least one drawer configured to be stored between the cover and the floor, the drawer having a front end and a rear end, wherein the drawer is configured to be installed with the front end toward the front of the vehicle and the rear end toward the rear of the vehicle;
    a support structure configured to attach to the compartment and to support the cover substantially horizontally above the floor; and a drawer face configured to cover the drawer at the rear end of the drawer, wherein the drawer face is set at an angle of at least 30 degrees from vertical leaning toward the front of the vehicle to facilitate rolling or sliding cargo onto the cover for storage within the compartment.

2. The storage apparatus of claim 1 further comprising a plurality of dividers configured to be installed within the drawer to form separate storage areas within the drawer, wherein the drawer and dividers are configured so that the dividers may be installed in a plurality of locations to form different sizes of storage areas and wherein the dividers may be installed in at least two orientations at right angles to each other.

3. The storage apparatus of claim 1 having substantially the same horizontal dimensions as the floor of the compartment.

4. The storage apparatus of claim 1, the support structure further comprising a plurality of drawer slides configured to slidably support the drawer.

5. The storage apparatus of claim 1, the support structure further comprising a plurality of support beams having a cross section with a greater dimension at the bottom than at the top, the cross section gradually decreasing in dimension from the bottom to the top.

6. The storage apparatus of claim 1 wherein the drawer face is set at an angle of about 45 degrees from vertical leaning toward the front of the vehicle.

7. The storage apparatus of claim 1 having substantially the same horizontal dimensions as the floor of the compartment such that the storage apparatus overlies substantially all of the floor.

8. The storage apparatus of claim 1 comprising a seal substantially along the perimeter of the cover to at least partially prevent at least one of dirt and sand from unintentionally getting between the cover and the floor at least when the drawer is in a closed position, wherein the seal comprises an elastomeric material.

9. The storage apparatus of claim 8 having substantially the same horizontal dimensions as the floor of the compartment such that the storage apparatus overlies substantially all of the floor.

10. The storage apparatus of claim 1, comprising a plurality of wheel well cutouts in the cover to allow the cover to sit below the top of the plurality of wheel wells in the compartment.

11. The storage apparatus of claim 1 wherein the cover comprises diamond plate.

12. The storage apparatus of claim 1 comprising:
    a seal substantially along the perimeter of the cover to at least partially prevent at least one of dirt and sand from unintentionally getting between the cover and the floor at least when the drawer is in a closed position; and
    a plurality of wheel well cutouts in the cover to allow the cover to sit below the top of the plurality of wheel wells in the compartment.

13. The storage apparatus of claim 12 wherein the drawer face is set at an angle of about 45 degrees from vertical leaning toward the front of the vehicle.

14. The storage apparatus of claim 12 having substantially the same horizontal dimensions as the floor of the compartment such that the storage apparatus overlies substantially all of the floor.

15. A storage unit configured to be installed within a bed of a pickup truck, the pickup truck having a front and a rear, the bed having a floor, walls having a top, and a tail gate, the storage unit comprising:
- a top surface substantially parallel to the floor of the bed and covering a majority of the floor of the bed, the top surface being closer to the floor than to the top of the walls of the bed;
- a seal between the top surface and the bed;
- at least one storage compartment located between the floor of the bed and the top surface of the storage unit;
- an angled ramp sloping upward toward the front of the pickup truck, the ramp extending substantially from the floor of the bed by the tail gate to the top surface of the storage unit; and
- wherein the storage compartment is a drawer and the ramp is attached to the drawer.

16. The storage unit of claim 15 wherein the storage unit covers substantially all of the floor of the bed such that the storage unit overlies substantially all of the floor.

17. The storage unit of claim 15 wherein the drawer configured to pull out of the rear of the pickup truck when the tail gate is down.

18. The storage unit of claim 15 further comprising a plurality of dividers configured to be installed within the drawer to form separate storage areas within the drawer, wherein the drawer and dividers are configured so that the dividers may be installed in a plurality of locations to form different sizes of storage areas and wherein the dividers may be installed in at least two orientations at right angles to each other.

19. A method of installing storage devices in the beds of a plurality of different pickup trucks, at least a plurality of the beds having different dimensions, each bed having walls having a height, a floor having a length, and at least one width, the method comprising in any order at least the steps of:
- providing a plurality of substantially identical size drawers having a length that is no less than 50 percent of the length of at least one size bed;
- providing a plurality of different size covers configured to mount in the beds having different dimensions, the covers each having a length that is no less than the length of the drawers;
- providing a plurality of ramps wherein the ramps angle upward from the floor of the beds to the covers and wherein the ramps are attached to the drawers and form faces of the drawers;
- providing support structures configured to support the covers above the drawers, the support structures being configured to support the covers no more than one half of the height of the walls above the floor of the bed; and
- at least one of installing in the beds of the pickup trucks, a plurality of the storage devices, each storage device comprising at least one of the substantially identical size drawers, one of the covers having different dimensions, and at least one of the support structures.

20. The method of claim 19 further comprising the step of providing a means for sealing between the covers and the beds.

21. The method of claim 19 wherein the storage device is configured to overlie substantially all of the floor of the bed in which the storage device is to be installed.

* * * * *